(12) United States Patent
Gorsuch et al.

(10) Patent No.: US 8,448,210 B2
(45) Date of Patent: May 21, 2013

(54) APPARATUS, SYSTEMS AND METHODS FOR RICH MEDIA ELECTRONIC PROGRAM GUIDES

(75) Inventors: Ryan Gorsuch, Parker, CO (US); William Norris Moran, Highlands Ranch, CO (US); Jason Michael Anguiano, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 538 days.

(21) Appl. No.: 12/571,159

(22) Filed: Sep. 30, 2009

(65) Prior Publication Data

US 2011/0078735 A1    Mar. 31, 2011

(51) Int. Cl.
| | |
|---|---|
| *H04N 7/10* | (2006.01) |
| *H04N 7/025* | (2006.01) |
| *H04N 5/445* | (2011.01) |
| *G06G 3/00* | (2006.01) |
| *G06F 13/00* | (2006.01) |

(52) U.S. Cl.
USPC ............................................. 725/50; 725/32

(58) Field of Classification Search
None
See application file for complete search history.

(56) References Cited

U.S. PATENT DOCUMENTS

| | | | |
|---|---|---|---|
| 5,047,867 A | 9/1991 | Strubbe et al. | |
| 5,231,493 A | 7/1993 | Apitz | |
| 5,398,074 A | 3/1995 | Duffield et al. | |
| 5,422,674 A | 6/1995 | Hooper et al. | |
| 5,430,486 A | 7/1995 | Fraser et al. | |
| 5,434,624 A | 7/1995 | Ishimura | |
| 5,442,398 A | 8/1995 | Koshiro et al. | |
| 5,452,012 A | 9/1995 | Saitoh | |
| 5,523,796 A | 6/1996 | Marshall et al. | |
| 6,005,562 A | 12/1999 | Shiga et al. | |
| 6,421,067 B1 | 7/2002 | Kamen et al. | |
| 6,859,236 B2 | 2/2005 | Yui | |
| 6,961,097 B2 | 11/2005 | Yui | |
| 7,375,769 B2 | 5/2008 | Yui | |
| 7,434,245 B1 | 10/2008 | Shiga et al. | |
| 7,503,003 B2 | 3/2009 | Kamen et al. | |
| 2001/0033340 A1 | 10/2001 | Yui | |
| 2003/0014752 A1 | 1/2003 | Zaslavsky et al. | |
| 2003/0115607 A1* | 6/2003 | Morioka et al. | ................. 725/61 |
| 2003/0200545 A1* | 10/2003 | Nakada | ........................... 725/53 |
| 2003/0221192 A1 | 11/2003 | Rappaport et al. | |
| 2005/0048916 A1* | 3/2005 | Suh | ................................ 455/39 |
| 2005/0204383 A1 | 9/2005 | Boulanger | |
| 2005/0278740 A1 | 12/2005 | Helms | |
| 2006/0085825 A1 | 4/2006 | Istvan et al. | |
| 2007/0005653 A1 | 1/2007 | Marsh | |
| 2008/0060032 A1* | 3/2008 | Toutenhoofd | ................. 725/105 |
| 2009/0112930 A1 | 4/2009 | Anguiano | |

FOREIGN PATENT DOCUMENTS

| | | |
|---|---|---|
| EP | 0598576 A2 | 5/1994 |
| EP | 1024661 A2 | 8/2000 |

* cited by examiner

*Primary Examiner* — Mark D Featherstone
(74) *Attorney, Agent, or Firm* — Lowe Graham Jones PLLC

(57) ABSTRACT

Electronic program guide (EPG) systems and methods are operable to incorporate image information into an EPG generated at a media device. An exemplary embodiment receives an image associated with a program, processes the received image into a rich media EPG image, receives program presentation schedule information that specifies a presentation schedule of a plurality of programs, wherein the program is one of the plurality of programs scheduled for presentation, associates an identifier with the rich media EPG image and the program, and generates a rich media EPG schedule based upon the received program presentation schedule information and the identifier.

1 Claim, 4 Drawing Sheets

APPARATUS, SYSTEMS AND METHODS FOR RICH MEDIA ELECTRONIC PROGRAM GUIDES

BACKGROUND

Electronic program guides (EPGs) are commonly used to present programming viewing choices that may be selected by a viewer of a media device, such as a television or the like. Supplemental information, such as images, may also be presented on the EPG. However, communicating such image data, even in reduced size, significantly increases the amount of time and/or bandwidth for the media device to acquire the EPG information. Accordingly, there is a need to provide improved communication methods and image data management methods for images that are integrated into an EPG.

SUMMARY

Electronic program guide (EPG) systems and methods are operable to incorporate image information into an EPG generated at a media device. An exemplary embodiment has an EPG rich media manager and an EPG manager. The EPG rich media manager is operable to receive an image, wherein the received image is associated with a program, process the received image into a rich media EPG image, and define an identifier for the rich media EPG image. The EPG manager is communicatively coupled to the EPG rich media manager and is operable to receive program presentation schedule information, wherein the program presentation schedule information specifies at least a presentation schedule for presentation of a plurality of programs at a media device. In response to the program associated with the rich media EPG image being included in the plurality of programs scheduled for presentation, the EPG manager is operable associate the identifier with the program, and generate a rich media EPG schedule based upon the received program presentation schedule information and the identifier.

In accordance with further aspects, an exemplary embodiment receives an image associated with a program, processes the received image into a rich media EPG image, receives program presentation schedule information that specifies a presentation schedule of a plurality of programs, wherein the program is one of the plurality of programs scheduled for presentation, associates an identifier with the rich media EPG image and the program, and generates a rich media EPG schedule based upon the received program presentation schedule information and the identifier.

In accordance with further aspects, another exemplary embodiment receives a rich media EPG image, wherein the rich media EPG image is associated with a unique identifier; stores the received rich media EPG image in a memory at a selected location of the memory; associates the selected location where the rich media EPG image is stored with the unique identifier of the rich media EPG image; receives rich media EPG schedule information, wherein the rich media EPG schedule information specifies at least a schedule of a program of interest and the unique identifier of the rich media EPG image; retrieves the rich media EPG image from the memory based upon the unique identifier received in the rich media EPG schedule information and based upon the selected location where the rich media EPG image is stored; and generates a rich media EPG, where in response to displaying information pertaining to the program of interest, the displayed information comprises at least the schedule of the program of interest and the retrieved rich media EPG image.

BRIEF DESCRIPTION OF THE DRAWINGS

Preferred and alternative embodiments are described in detail below with reference to the following drawings.

DETAILED DESCRIPTION

Figure 1:
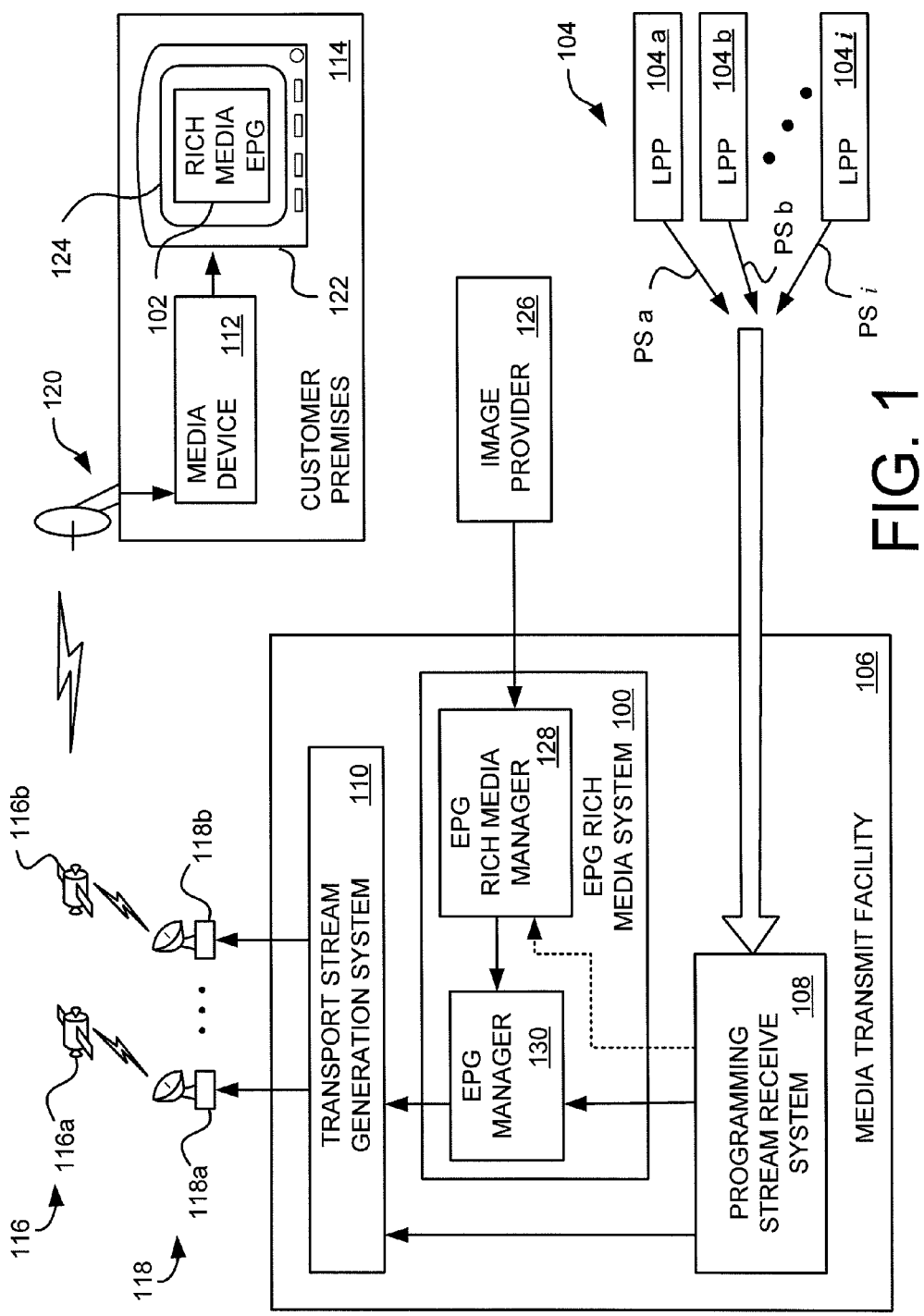
FIG. 1 is a block diagram of an embodiment of an electronic program guide (EPG) rich media system.

FIG. 1 is a block diagram of an embodiment of an electronic program guide (EPG) rich media system 100. An exemplary embodiment of the EPG rich media system 100 facilitates display of images in conjunction with presentation of a rich media EPG 102 on a display. The rich media EPG 102 includes, in addition to textual and numerical information pertaining to available programming, one or more related images. Since the images relate to the subject matter of programs that are indicated on the rich media EPG 102, the viewer may better appreciate the subject matter and/or characteristics of programs that are available from the media provider.

In overview, a media provider employs a media communication system to provide programming to its customers. In an exemplary media system, the media provider receives a plurality of programs PSa-PSi from local and/or national programming providers 104 (LPPs 104a-104i). The programs PSa-PSi are communicated to a media transmit facility 106 operated by a media provider, and received by a programming stream receive system 108. The programming stream receive system 108 processes the received programs PSa-PSi as necessary to prepare them for transmission to the customers. For example, commercials or the like may be incorporated with a particular one of the programs PSa-PSi.

The processed programs PSa-PSi are communicated from the programming stream receive system 108 to the transport stream generation system 110, which bundles the programs PSa-PSi into one or more transport streams. The transport streams are then communicated to a viewer's media device 112. In some applications, the media device 112 may reside at a customer premises 114. In other applications, the media device 112 may be portable.

The exemplary media communication system provides programming to its customers via a plurality of satellites 116. In a satellite network embodiment, the transport streams are uplinked to each satellite 116 through a corresponding transmit antenna 118. The respective transport streams are then communicated from the satellite 116 down to a receiver antenna 120 at the customer premises 114.

A program of interest Pi may be selected by a viewer who provides suitable instructions to the media device 112. The program of interest Pi is identified by its particular "channel" in the received transport stream. The media device 112 tunes itself to the particular channel on which the program of interest Pi is available, and then retrieves the selected program of interest Pi from the transport stream. The program of interest Pi is then presented on a media presentation device 122. For example, but not limited to, the media device 112 may be a set top box (STB) that is coupled to a suitable media presentation device 122, such as a television (TV), personal computer (PC) or the like. A display 124 presents the selected program of interest Pi to the viewer.

To aid the viewer in the selection of a program of interest Pi, the rich media EPG 102 is presented to the viewer on the display 124 (typically in response to a viewer request to view the rich media EPG 102). Thus, the viewer may navigate about the rich media EPG 102 to obtain information about available programs and view related rich media EPG images pertaining to particular available programs. Further, the viewer may select a program of interest Pi for current viewing, future viewing, and/or recording via the rich media EPG 102.

Other media providers may provide programming to their customers via other types of communication systems. For example, some media providers may use a cable network, wireless, wired, or other network configurations, such as the Internet, to provide programming to their customers. Embodiments of the EPG rich media system 100 may be configured to operate over any suitable type of communications system.

Embodiments of the EPG rich media system 100 are configured to facilitate management of images and to facilitate integration of images with programming information that is used to construct the rich media EPG 102. Images are provided by an image provider 126. The image provider 126 corresponds to any source where images pertaining to available programming may be available. Examples of the image provider 126 may be an Internet site, a library, a commercial image provider, or even an individual, such as a photographer. Images may include still photographs, video clips, or other graphic objects such as logos, watermarks, or the like.

Images are received by the EPG rich media manager 128 from the image provider 126 may be received using any suitable media. For example, images may be received electronically via a communication network, such as, but not limited to, the internet. Images may be received on a recordable medium, such as, but not limited to, a compact disk (CD), a flash memory, a magnetic tape, an optical disc, or the like. Images may be received in the programs PSa-PSi. For example, a still frame of a video program or a video clip of a program may be selected as an image. Images may even be provided in a hard-copy format such as a photograph, which can be electronically scanned, and optionally further processed, to generate an electronic image.

The EPG rich media manager 128 processes selected images that are relevant to the programs listed on a current EPG, and generates rich media EPG images that are suitable for incorporating into a rich media EPG 102. Processed rich media EPG images are communicated from the EPG rich media manager 128 to an EPG manager 130. The EPG manager 130 receives program presentation schedule information pertaining to the schedule of programming provided by the local and/or national programming providers 104, and/or provided by a third party. The information may be provided by the local programming and/or national providers 104 themselves, or from another source. The program presentation schedule information typically includes program titles, scheduled presentation dates and times, duration of the programs, and supplemental information. The supplemental information may include a synopsis of the subject matter of the programs and/or a creation date. The supplemental information may also include a listing of actors, performers, producers, and other individuals and/or organizations involved with the production of a particular program.

The EPG manager 130 processes the received program presentation schedule information, any related supplemental information, and pertinent rich media EPG images, to generate information that is ultimately used to construct the rich media EPG 102 by the media device 112 at the customer premises 114. The generated information is provided to the transport stream generation system 110 for incorporation into one or more of the transport streams.

More particularly, an exemplary embodiment of the EPG manager 130 generates rich media EPG schedule information and rich media EPG image information. The rich media EPG schedule information comprises textual and numerical information pertaining to programs that are currently available and/or are scheduled for future presentation. The rich media EPG schedule information is used to generate the textual and numerical portions of the rich media EPG 102. The rich media EPG image information includes a plurality of rich media EPG images that are related to the programs identified in the rich media EPG schedule information. Rich media EPG images are presented to the viewer of the rich media EPG 102.

The rich media EPG schedule information and the rich media EPG image information may be separately communicated to the media device 112 in an efficient manner, thus overcoming the limitations of the prior art EPG systems. It is appreciated that communication of image data is a relatively data intensive process because of the large amount of digital data needed to generate an image. Further, data storage requirements at the remote media device 112 is relatively limited. Thus, embodiments of the EPG rich media system 100 identify images that pertain to a current EPG. The relevant images are processed into rich media EPG images that utilize less data. Selected relevant rich media EPG images may then be communicated from the media transmit facility 106 to many media devices 112. Further, the rich media EPG images may be communicated to the media device 112 at convenient times, thereby optimizing bandwidth use of the transport streams.

Further, information identifying rich media EPG images stored on the media device 112 that are no longer needed can be provided so that the media device 112 can erase, discard, or otherwise delete stale rich media EPG images that are no longer needed. Relevant rich media EPG images are retained. Thus, memory capacity use at the media device 112 may be optimized.

Figure 2:
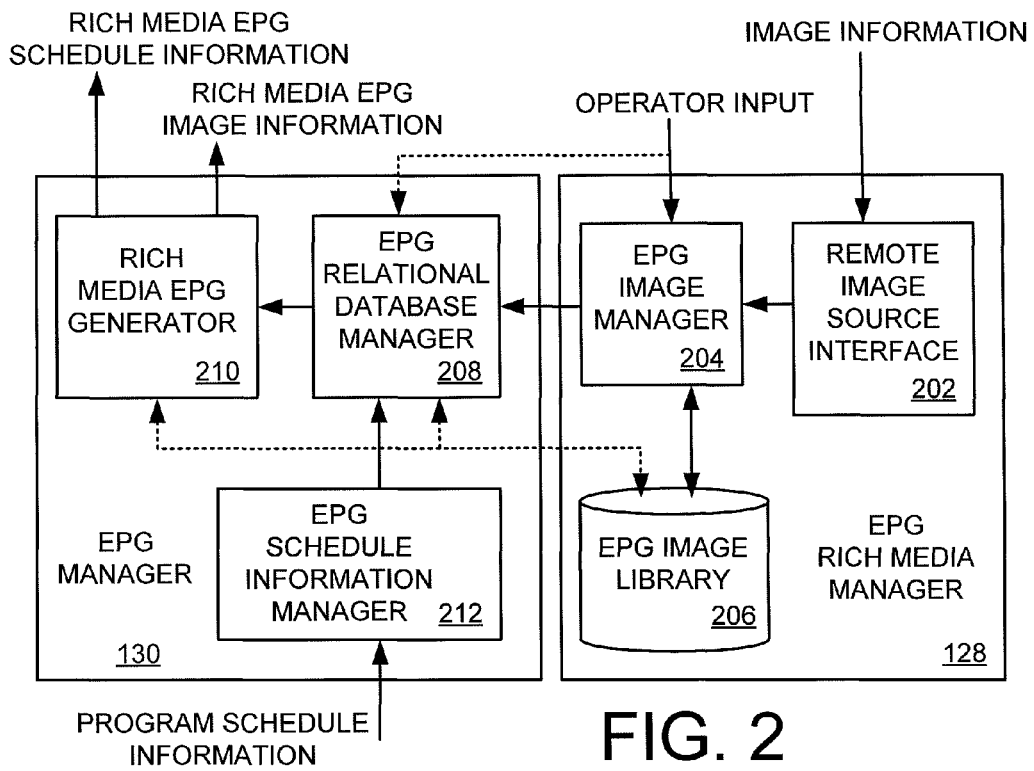
FIG. 2 is a block diagram of an embodiment of an EPG rich media manager and an EPG manager implemented at a media transmit facility of a media communication system.

FIG. 2 is a block diagram of an embodiment of the EPG rich media manager 128 and the EPG manager 130 implemented at the media transmit facility 106. The EPG rich media manager 128 comprises a remote image source interface 202, an EPG image manager 204, and an EPG image library 206. The EPG manager 130 comprises an EPG relational database manager 208, a rich media EPG generator 210, and an EPG schedule information manager 212. In some embodiments, the EPG rich media manager 128 and the EPG manager 130 may be integrated together, and/or may be integrated with other systems. Other embodiments may include some, or may omit some, of the above-described components. Further, additional components not described herein may be included in alternative embodiments. For example, the components may each include their own processor systems (not shown) acting cooperatively together to manage and/or generate the rich media EPG image information and the rich media EPG schedule information. In other embodiments, a single processor system (not shown) may be used to implement the functionality of the remote image source interface 202, the EPG image manager 204, the EPG image library 206, the EPG relational database manager 208, the rich media EPG generator 210, and/or the EPG schedule information manager 212.

The remote image source interface 202 is operable to receive images pertaining to scheduled programs that are described in the rich media EPG schedule information. The received images may be received in any format. The images may be large, data intensive images. The received images may even be provided in the form of video clips or hard copy photographs. Images may be of people, scenes, and/or objects.

Received images also include, and/or are associated with, image identifier information. The image identifier information is used to associate a particular image with one or more programs. For example, the image identifier information may include a program title. Alternatively, or additionally, the image information may include the names of the actors, performers, producers or other individuals associated with a program that is, or will be, scheduled for presentation.

Image information may associate an image with a plurality of different programs. For example, a generic image of an actress may be used as an image and associated with a plurality of different programs. As another example, a generic image of a location, such as a building, town, city, landscape, may be used as an image and associated with a plurality of different programs. As yet another example, a generic image of an object, such as a particular model of automobile, airplane, ship or the like may be used as an image and associated with a plurality of different programs.

Figure 3:
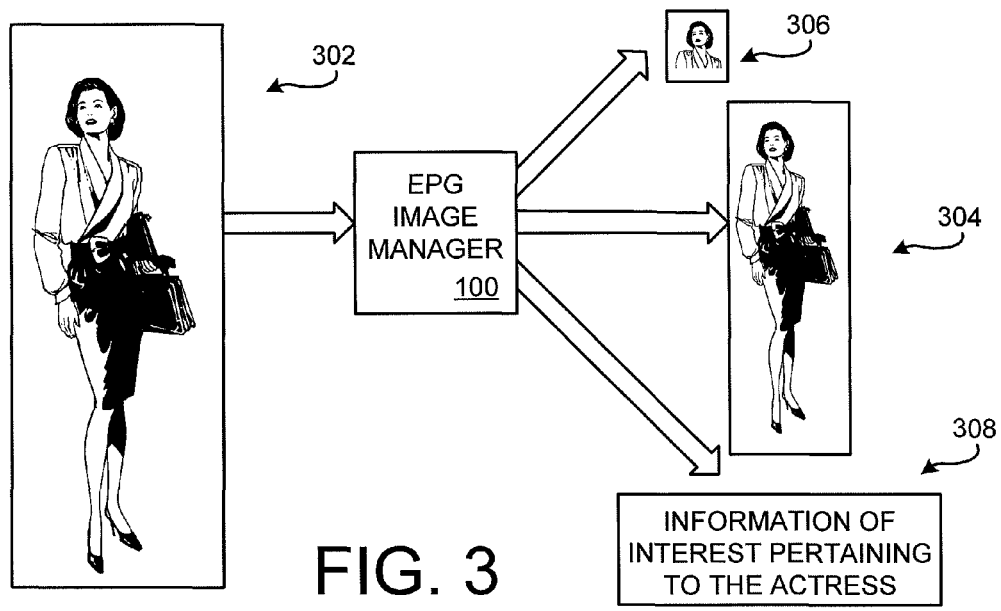
FIG. 3 conceptually illustrates one embodiment for processing of a received image for use with a rich media EPG.

Received images are provided to the EPG image manager 204. The EPG image manager 204 processes the received images into a format that is suitable for the rich media EPG 102. FIG. 3 conceptually illustrates transforming a received image 302 of an actress for use with a rich media EPG 102. It is appreciated that the received image 302 of the actress is not likely ideal for direct use by the rich media EPG 102. For example, the data size of the received image 302 of the actress may be relatively large. Thus, the EPG image manager 204 may transform, or otherwise process, the received image 302 of the actress into a rich media EPG image 304 of the actress that uses data compression or simply reduces image size so as to reduce the amount of image data. Alternatively, or additionally, the EPG image manager 204 may crop the received image 302 of the actress, and may even further compress or reduce the size of the cropped image portion, to generate a second rich media EPG image 306. Rich media images EPG 304, 306 are particularly suitable for insertion into a transport stream for communication to the customer's media device 112. Further, the rich media EPG images 304, 306 may be formatted for the particular image formats used by the media device 112 when it generates the rich media EPG 102. Additionally, or alternatively, the image could be resized, increase the compression ratio, reduce the image bit depth, using a grayscale, etc.

Additionally, the EPG image manager 204 may receive supplemental information pertaining to the received input images from the remote image source interface 202 and/or from another source. In an exemplary embodiment, the EPG schedule information manager 212 receives program presentation schedule information from the programming stream receive system 108, which has received the programs PSa-Psi from the local and/or national programming providers 104. The received information from the programming providers 104 may also include supplemental information pertaining to the programming. Alternatively, or additionally, the program presentation schedule information and/or supplemental information may be provided by other sources. Accordingly, the EPG image manager 204 may prepare related supplemental information of interest pertaining to the actress of the received image 302 into a rich media EPG image information file 308 that is associated with the generated rich media EPG images 304, 306.

The EPG image manager 204 is optionally configured to receive instructions and/or information from an operator, such as a technician or the like. The operator may specify image parameters (image dimensions, data size or limits, image format or the like) for the generated rich media EPG images. The operator may also provide the supplemental information that is used to generate the rich media EPG image information files associated with a particular rich media image. Any suitable input system or device (not shown) may be used to receive input from an operator by the various embodiments of the EPG image manager 204.

The generated rich media EPG images and the associated rich media EPG image information files are stored (saved) into the EPG image library 206. The EPG image library 206 may be any suitable memory medium or information storage system. Further, a unique identifier is generated and associated with each of the generated rich media EPG images and/or the associated rich media EPG image information files. Alternatively, separate unique identifiers may be generated and associated with each of the generated rich media EPG images and with the associated rich media EPG image information files. The unique identifiers are used as part of a relational database management approach so that the media device 112 can efficiently store and access the rich media EPG images and the associated rich media EPG image information files when it constructs the rich media EPG 102 at the customer premises 114.

The EPG schedule information manager 212 manages the received program presentation schedule information and/or supplemental information so that it may be compiled into the rich media EPG 102. For example, for any particular day and time, program presentation schedule information and/or supplemental information for hundreds of individual programs may be received from the programming providers 104 or other sources. This program presentation schedule information (and any included supplemental information) may be grouped so that it is easily accessible when programming scheduled for that particular time and date is to be shown on the rich media EPG 102.

The EPG relational database manager 208 receives the program presentation schedule information and the unique identifiers for EPG images (and the associated rich media EPG image information files), and associates the unique identifiers with the appropriate programs that will be listed in the rich media EPG 102. In an exemplary embodiment, the EPG relational database manager 208 processes the program presentation schedule information on a program-by program basis. When the program presentation schedule information for a particular program has corresponding available rich media EPG images and the associated rich media EPG image information files, an exemplary embodiment of the EPG relational database manager 208 adds the unique identifier(s) into the EPG program information for that particular program.

The rich media EPG generator 210, using program information for each scheduled program, and the available unique identifiers of any available rich media EPG images (and the associated rich media EPG image information files) determined by the EPG relational database manager 208, generates the rich media EPG schedule information. The rich media EPG schedule information is then provided to the transport stream generation system 110 for incorporation into one or more transport streams as a stream of rich media EPG schedule information that is receivable by the media device 112. Accordingly, when the media device 112 constructs a rich media EPG 102, the media device 112 knows the appropriate program presentation schedule information and knows the unique identifiers of any rich media EPG images (and/or the associated rich media EPG image information files) that may be available for that particular program.

The rich media EPG generator 210 also retrieves pertinent rich media EPG images and the associated rich media EPG image information files from the EPG image library 206, and generates the rich media EPG image information. The rich media EPG image information is then provided to the transport stream generation system 110 for incorporation into one or more transport streams as a stream of rich media EPG image information that is receivable by the media device 112. Accordingly, when the media device 112 constructs a rich media EPG 102 using selected rich media EPG images and/or selected associated rich media EPG image information files for the scheduled program.

The generated rich media EPG schedule information and the generated rich media EPG image information may be incorporated into the transport stream by the transport stream generation system 110 in any suitable manner. Some embodiments may use a single transport stream to send both the rich media EPG schedule information and the rich media EPG image information. The rich media EPG schedule information and the rich media EPG image information may be transmitted in a serial fashion (the rich media EPG schedule information transmitted during a first time period, followed by the rich media EPG image information transmitted during a second time period). For example, but not limited to, the rich media EPG image information may be transmitted during off peak hours, such as early in the morning.

The rich media EPG schedule information and the rich media EPG image information may be segmented and incorporated into the transport stream in segments. Some embodiments may use two or more transport streams to separately transmit the rich media EPG schedule information and the rich media EPG image information to the media device 112. Some embodiments may incorporate one or both of the rich media EPG schedule information and the rich media EPG image information in streams that transport other information to the media device 112.

Figure 4:
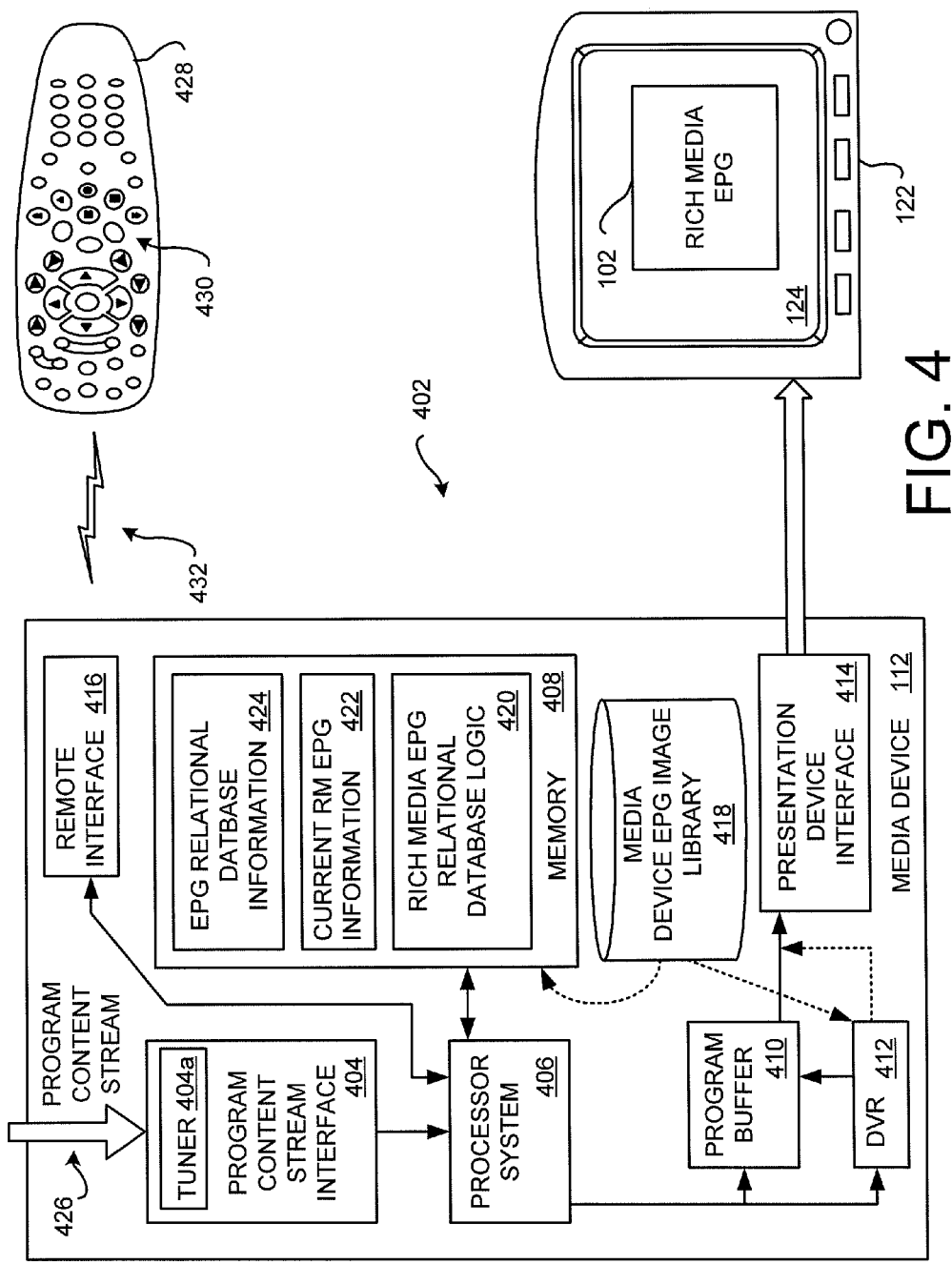
FIG. 4 is a block diagram of an embodiment of a EPG media device manager operating in a media device at the customer premises.

FIG. 4 is a block diagram of an embodiment of an EPG media device manager 402 operating in a media device 112. The EPG media device manager 402 is operable to control generation of the rich media EPG 102 by the media device 112. Examples of the media device 112 include, but not limited to, a set top box (STB). Embodiments of the EPG media device manager 402 may be implemented in other media devices, such as, but not limited to, stereos, radios, televisions (TVs), digital video disc (DVD) players, digital video recorders (DVRs), cellular or mobile phones equipped with video functionality, personal device assistants (PDAs), or personal computers (PCs).

The non-limiting exemplary media device 112 comprises a program content stream interface 404, a processor system 406, a memory 408, a program buffer 410, an optional digital video recorder (DVR) 412, a presentation device interface 414, a remote interface 416, and an optional media device EPG image library 418. The memory 408 comprises portions for storing the rich media EPG relational database logic 420, the current rich media EPG schedule information 422, and the EPG relational database information 424. In some embodiments, the electronic program guide (EPG) information 422, and the EPG relational database information 424 are integrated together into a single database, and/or may be integrated with other information. Other media devices may include other components not described herein, or may omit some of the above-described media processing components.

The functionality of the media device 112, here a set top box, is now broadly described. One or more program content streams 426 are received by the program content stream interface 404. The program content streams 426 reside in the transport streams provided from the media system operated by the programming provider. Non-limiting examples of such media systems include satellite systems, cable system, and the Internet.

One or more tuners 404a in the program content stream interface 404 selectively tune to one of the program content streams 426 in accordance with instructions received from the processor system 406. A program content stream 426 typically comprises a plurality of programs multiplexed together. The processor system 406, based upon a request for a program of interest specified by a user, parses out program content associated with the program of interest. The program of interest is then assembled into a stream of video and/or audio information which may be saved into the program buffer 410 such that the program content can be streamed out to the media presentation device 122, such as the television, via the presentation device interface 414. Alternatively, or additionally, the parsed out program content may be saved into the DVR 412 for later presentation.

From time to time, the rich media EPG schedule information is received at the media device 112, via the program content stream 426 or via another suitable data stream. The received rich media EPG schedule information is used to populate the current rich media (RM) EPG schedule information 422 portion of the memory 408. The current rich media EPG schedule information 422 portion of the memory 408 stores the information pertaining to the scheduled programming and the unique identifiers associated with each of the generated rich media EPG images. The rich media EPG schedule information may include, but is not limited to, a scheduled presentation start and/or end time, a program channel, the unique identifiers, and/or descriptive information. The program's descriptive information may include the title of the program, names of performers or actors, date of creation, and a summary describing the nature of the program. Any suitable information may be included in the program's supplemental information.

From time to time, the rich media EPG image information is also received at the media device 112, via the program content stream 426 or via another suitable data stream. The received rich media EPG image information, and any associated rich media EPG image information files, are saved into a media device EPG image library 418 at selected locations. The media device EPG image library 418 may be portion of the memory 408, may be a portion of the memory of the DVR 412, or may be a separate memory. The rich media EPG images, and any associated rich media EPG image information files, are saved in selected locations in a manner such that the unique identifiers associated with the rich media EPG images, and any associated rich media EPG image information files, are accessible by using the unique identifiers to determine the selected storage locations in the media device EPG image library 418.

For example, the rich media EPG relational database logic 420 manages the received rich media EPG images, and any associated rich media EPG image information files, using a relational database system. In an exemplary embodiment, the unique identifiers are stored in the EPG relational database information 424, which may be a table or the like. Further, memory indexes, pointers, or the like, identify the selected location in the media device EPG image library 418 where with unique identifiers of the rich media EPG images, and any associated rich media EPG image information files, have been stored. Accordingly, the rich media EPG relational database logic 420 permits each media device 112 to independently manage received rich media EPG images and rich media EPG image information files.

The media device 112 is configured to receive commands from a user via an optional remote control 428. The remote control 428 includes one or more controllers 430. The viewer, by actuating one or more of the controllers 430, causes the remote control 428 to generate and transmit commands, via a wireless signal 432, to the media device 112. Upon receipt of a command from the user requesting presentation of a rich media EPG 102, the rich media EPG 102 is generated, formatted, and then presented on the display 124. The user may navigate about the rich media EPG 102 to control presentation of information shown on the rich media EPG 102, which includes textual information and numerical information pertaining to scheduled programs, along with any relevant rich media EPG images that may be available for those programs indicated on the rich media EPG 102.

When the rich media EPG 102 is generated, one or more of the unique identifiers is found in the rich media EPG schedule information for a particular program whose scheduling information is included in the rich media EPG 102. The unique identifiers are used to identify corresponding rich media EPG images and/or rich media EPG image information files. Since the location of the rich media EPG images and/or rich media EPG image information files stored in the media device EPG image library 418 is determinable based upon the EPG relational database information 424, the pertinent rich media EPG images and/or rich media EPG image information files are retrieved and are then included in the generated rich media EPG 102.

Figure 5:
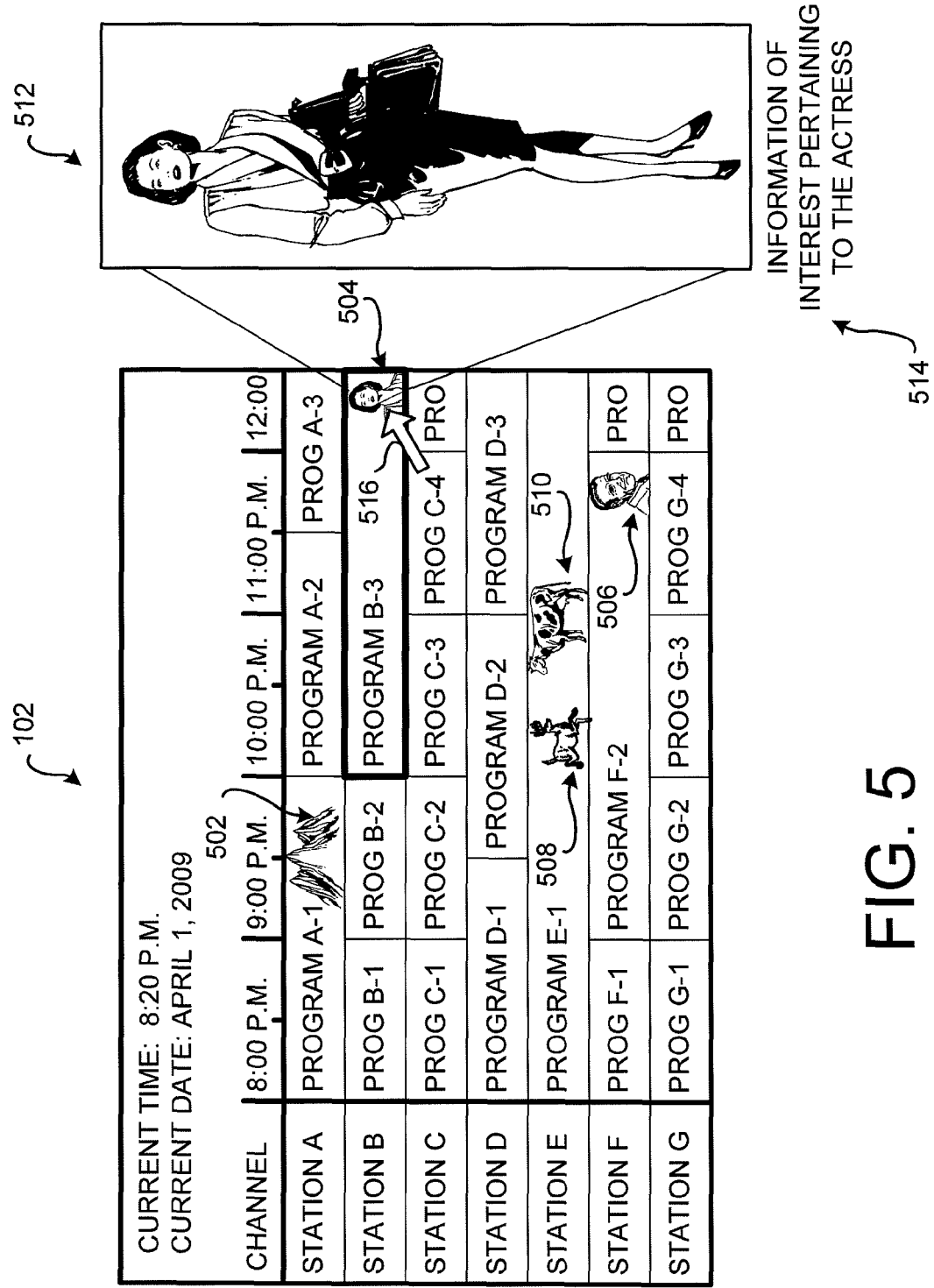
FIG. 5 is a displayed portion of an exemplary rich media EPG generated by an embodiment of the EPG rich media system.

FIG. 5 is a displayed portion of an exemplary rich media EPG 102 generated by an embodiment of the EPG rich media system 100. The presented portion of the rich media EPG 102 provides program information currently available for a plurality of programming channels, including any available rich media EPG images and/or rich media EPG image information files.

The programming channels are identified by a suitable identifier, such as the name of the programming station or the like. Here, the seven programming channels are identified as stations A-G. The media device 112 is configured to present programming that is provided by many different programming channels, sometimes even several hundreds of different programming channels. Accordingly, the viewer is able to navigate about the rich media EPG 102 so as to be able to view program information provided on one or more programming channels of interest.

Here, it is presumed that the viewer wishes to view an EPG that provides information pertaining to currently available programs. In this example, the current time is 8:20 p.m. on April 1. The information provided in the rich media EPG 102 is based on information in the current EPG information 422 portion of the memory 408 (FIG. 4), which is updated from time to time.

Programs that are available at the current time of 8:20 p.m. are identified on the displayed portion of the rich media EPG 102. In this exemplary rich media EPG 102, programs currently available are shown adjacent to the programming channel on which they are available. For example, program A1 is currently available on the programming channel identified as "Station A" (and so on). Further, a small rich media EPG image 502 is included in the portion of the rich media EPG 102 pertaining to the program A1. Here, the rich media EPG image 502 is of a mountain, and may indicate to the viewer that the program A1 relates to the mountain.

When the rich media EPG 102 is constructed, the rich media EPG image information is initially processed to select program information pertaining to the displayed portion of the of the rich media EPG 102. For example, when information for the program A1 is processed, the program title, scheduled presentation times, channel information, and possibly some small amount of supplemental information is retrieved. Also, a unique identifier for the rich media EPG image 502 is encountered. Using the EPG relational database information 424, the stored location of the rich media EPG image 502 in the media device EPG image library 418 can be determined. Thus, when the portion of the rich media EPG 102 that includes information for program A1 is generated, the rich media EPG image 502 can be retrieved and incorporated into the displayed portion of the rich media EPG 102.

Similarly, the displayed portion of the portion of the rich media EPG 102 pertaining to the program B3 includes a rich media EPG image 504 of a woman. Also, the displayed portion of the portion of the rich media EPG 102 pertaining to the includes a rich media EPG image 506 of a man. Thus, the viewer may recognize the man and/or the woman as a famous actress or actor, respectively, that may play a significant role in the program. As another example, the portion of the rich media EPG 102 pertaining to the program E1 includes rich media EPG images 508, 510 of a deer and a cow, respectively. Thus, the viewer may understand that the program E1 is related to an animal and/or wildlife program.

Further, the viewer may be interested in viewing larger images of interest. For example, the simplified rich media EPG 102 of FIG. 5 indicates that the viewer has navigated to and selected program B3 (as indicated by the bold outlining of the pane surrounding the information for program B3). Upon selection, an exemplary embodiment retrieves the rich media EPG image 512, which in this example, is a larger image of the woman shown in the rich media EPG image 504. Further, a corresponding rich media EPG image information file may be optionally retrieved such that the information is also presented on the rich media EPG 102. Here, the information obtained from the rich media EPG image information file is presented below the rich media EPG image 512.

In implementation, the rich media EPG relational database logic 420 or other EPG management logic responds to the selection of the program B3 by the viewer by determining that additional rich media EPG images, and any associated rich media EPG image information files, are available for the selected program. Here, the presence of the other information is indicated by their unique identifiers that is included with the information pertaining to program B3. Thus, upon selection of program B3, the unique identifier for the rich media EPG image 512 and the unique identifier for the rich media EPG image information file for the information of interest 514 is encountered. Using the EPG relational database information 424, the stored location of the rich media EPG image 512 in the media device EPG image library 418 is determined. Also, the stored location of the rich media EPG image information file for the information of interest 516 is determined. Thus, when the displayed portion of the rich media EPG 102 that includes information for program B1 is generated, the rich media EPG image 512 and the associated information of interest 514 are retrieved and incorporated into the rich media EPG 102.

In the exemplary rich media EPG 102 of FIG. 5, the additional rich media EPG image 512 and the supplemental information of interest 514 was presented as part of the display adjacent to the displayed portion of the rich media EPG 102. In some embodiments, the additional rich media EPG image 512 and the supplemental information of interest 514 may be overlaid on top of the displayed portion of the rich media EPG 102. In other embodiments, a new page with the related rich media EPG images, and any associated rich media EPG image information files, may be presented to the viewer. Thus, a plurality of rich media EPG images and/or a large amount of supplemental information of interest may be presented to the viewer.

Further, images themselves may be selectable such that additional rich media EPG images and/or rich media EPG image information files may be presented to the viewer. For example, one of the rich media EPG images and/or rich media EPG image information files may be highlighted, or otherwise selected, by the viewer. In response to selection by the viewer of a particular rich media EPG image, or a particular portion of supplemental information, additional rich media EPG images and/or a supplemental information of interest is accessed and presented to the viewer. For example, FIG. 5 illustrates that the viewer may select the rich media EPG image 502. In an exemplary embodiment, a new page of the rich media EPG 102 is generated with one or more additional rich media EPG images of the actress. Additionally, or alternatively, additional supplemental information of interest, such as personal and professional biographical information associated with the actress, may be presented to the viewer. In some embodiments, movie clips, video clips, and/or audio clips associated with a selected rich media EPG image may be retrieved and presented to the viewer. The nesting of available rich media EPG images and/or rich media EPG image information files is coordinated by the rich media EPG relational database logic 420 which has stored the unique identifiers, and the location of the rich media EPG images and/or rich media EPG image information files in the media device EPG image library 418.

In some embodiments, a pointer 516 or the like may be used by the viewer to navigate about a presented portion of a rich media EPG 102. When the pointer 516 is placed over, or in proximity to, a relatively small rich media EPG image, then one or more larger associated rich media EPG images, and/or any relevant supplemental information of interest contained in a rich media EPG image information file, may be accessed and presented on the displayed portion of the rich media EPG 102. For example, the pointer is in proximity to the rich media EPG image 504 of the woman. Thus, the larger rich media EPG image 512 and the associated information of interest 514 has been retrieved and incorporated into the displayed portion of the rich media EPG 102.

The unique identifier associated with a particular rich media EPG image and/or rich media EPG image information file may be associated with multiple programs. For example, for the program B3 the rich media EPG image 506 of the woman is presented on the displayed portion of the rich media EPG 102. This rich media EPG image 504 has a unique identifier. If the unique identifier for the rich media EPG image 504 is associated with other programs, when information for those other programs is presented on a displayed portion of the rich media EPG 102, the same rich media EPG image 502 (and optionally the same rich media EPG image 512 and/or rich media EPG image information 514) may be incorporated into the displayed portion of the rich media EPG 102. Thus, memory capacity of the media device EPG image library 418 can be reduced since one rich media EPG image may be used for multiple programs.

The information provided to the media device 112 may also include a list of unique identifiers that are no longer pertinent to the current schedule of programming that is included in a current rich media EPG 102. For example, the exemplary rich media EPG 102 of FIG. 2 illustrates information pertaining to scheduled programs that are presented on April 1. Assuming that the program B3 will not be available for presentation for some relatively long period of time, is appreciated that the rich media EPG image 502 (and optionally the same rich media EPG image 512 and/or rich media EPG image information 514) has become stale.

Accordingly, the media device 112 may receive a list of rich media EPG images and/or rich media EPG image information files that are no longer needed. Such stale rich media EPG images and/or rich media EPG image information files are erased, discarded, or otherwise deleted from the media device EPG image library 418. Thus, memory capacity of the media device EPG image library 418 can be reduced since those stale rich media EPG images and/or stale rich media EPG image information files that are no longer pertinent to a current rich media EPG 102 are erased, discarded, or otherwise deleted to make room for newly arriving rich media EPG images and/or rich media EPG image information files.

In some embodiments, the program information in a current rich media EPG 102 includes scheduling information for program channels that may not be authorized for a particular media device 112. For example, the media provider may communicate a single set of information that may be used to construct a rich media EPG 102 for all of its customers. But, many customers may not have subscribed to all services offered by the media provider. For example, some customers may not have subscribed to a particular premium movie channel. Accordingly, the rich media EPG relational database logic 420 could selectively discard (or not save) received rich media EPG images and/or rich media EPG image information files pertaining to the unauthorized program services. Thus, less memory capacity is utilized in the media device EPG image library 418.

In some embodiments, rich media EPG images and/or rich media EPG image information files are communicated to the media device on an incremental basis. That is, based upon knowledge of what particular rich media EPG images and/or rich media EPG image information files have been previously communicated to (and presumably stored by) the media device 112, only the currently pertinent rich media EPG images and/or rich media EPG image information files are sent to the media device 112. For example, a rich media EPG 102 may be limited to programming scheduled over a two week period (fourteen days). Embodiments determine what the time period is since the last update of the rich media EPG 102 (here, one day). Accordingly, the information for the rich media EPG 102 is updated by one day, and would primarily comprise the program information for the next day (the fifteenth day). Since, the incremental program presentation schedule information would pertain to the fifteenth day, only the rich media EPG images and/or rich media EPG image information files for the fifteenth day (and any updates pertinent to days two through fourteen) would be communicated to the media devices 112. Since the rich media EPG images and/or rich media EPG image information files for days two through fourteen are not retransmitted to the media device 112, communication bandwidth of the transport stream is reduced.

Some embodiments may use a different communication path to transmit the rich media EPG schedule information and/or the rich media EPG image information to the media device 112. For example, the media device 112 may be equipped to receive information over a secondary path or back channel. Such a secondary path or back channel could be used to transmit the rich media EPG schedule information and/or the rich media EPG image information to the media device 112. Accordingly, communication bandwidth of the transport stream is reduced.

An alternative embodiment may be configured to integrate rich media EPG images and/or rich media EPG image information files with a legacy EPG by using information pertaining to particular programs provided in the legacy EPG. For example, the program title may be used as the unique identifier that associates one or more rich media EPG images and/or rich media EPG image information files with a particular program. Other information, such as the names of actors or actresses, may be used as the unique identifier. Thus, the legacy EPG does not need to be modified to include the unique identifier. Rather, the unique identifiers are associated the transmitted rich media EPG images and/or rich media EPG image information files. When a displayed portion of the legacy EPG is processed, the embodiment also identifies any of the rich media EPG images and/or rich media EPG image information files that are associated with programs on the displayed portion of the legacy EPG. These identified rich media EPG images and/or rich media EPG image information files are then integrated with the legacy EPG to generate a rich media EPG 102.

It should be emphasized that the above-described embodiments of the EPG rich media system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for incorporating at least image information into an electronic program guide (EPG), the method comprising:
    generating rich media EPG image information, comprising:
        receiving an image associated with a first program scheduled for future presentation;
        processing the received image into a first rich media EPG image;
        generating a first identifier;
        associating the first identifier with the first rich media EPG image; and
        storing the generated first rich media EPG image information in a media transmit facility EPG image library, the first rich media EPG image information comprising the first rich media EPG image and the associated first identifier;
    generating a rich media EPG schedule, comprising:
        receiving program presentation schedule information that specifies a presentation schedule of a plurality of programs that are scheduled for future presentation, wherein the first program scheduled for future presentation is one of the plurality of programs scheduled for future presentation;
        associating the first identifier associated with the first rich media EPG image with the first program scheduled for future presentation;
        integrating the first identifier associated with the first rich media EPG image with the first program scheduled for future presentation to generate a current rich media EPG schedule; and
    communicating the current rich media EPG schedule to a plurality of media devices during a first time period, wherein the current rich media EPG schedule includes the presentation schedule of the plurality of programs scheduled for future presentation, and wherein the current rich media EPG schedule includes the first identifier that is associated with the first rich media EPG image and the first program scheduled for future presentation;
    receiving an updated current program presentation schedule information that specifies an updated presentation schedule of the plurality of programs, and wherein the current rich media EPG schedule becomes a stale rich media EPG that includes program schedule information that identifies at least one stale program that is no longer scheduled for future presentation, and wherein the at least one stale program is associated with a second identifier that identifies a second rich media EPG image stored in the media transmit facility EPG image library;
    generating an updated rich media EPG schedule based upon the received updated current program presentation schedule information and the first identifier that is associated with the first program and the first rich media EPG image;
    communicating the second identifier associated with the stale program to the plurality of media devices; and
    communicating the updated rich media EPG schedule to the plurality of media devices during a second time period, wherein the second time period is after the first time period that the previously communicated current rich media EPG schedule was communicated to the plurality of media devices.

* * * * *